(12) United States Patent
Aleksic et al.

(10) Patent No.: US 10,055,767 B2
(45) Date of Patent: Aug. 21, 2018

(54) SPEECH RECOGNITION FOR KEYWORDS (71) Applicant: Google LLC, Mountain View, CA (US)

(72) Inventors: Petar Aleksic, Jersey City, NJ (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 392 days.

(21) Appl. No.: 14/710,928

(22) Filed: May 13, 2015

(65) Prior Publication Data

US 2016/0335677 A1 Nov. 17, 2016

(51) Int. Cl.
*G06Q 30/00* (2012.01)
*G06Q 30/02* (2012.01)
*G10L 13/00* (2006.01)
*G10L 15/06* (2013.01)
*G10L 15/01* (2013.01)
*G10L 15/18* (2013.01)
*G10L 15/08* (2006.01)
(Continued)

(52) U.S. Cl.
CPC ..... *G06Q 30/0275* (2013.01); *G06Q 30/0256* (2013.01); *G10L 13/00* (2013.01); *G10L 15/01* (2013.01); *G10L 15/06* (2013.01); *G10L 15/18* (2013.01); *G10L 15/187* (2013.01); *G10L 15/26* (2013.01); *G10L 2015/088* (2013.01)

(58) Field of Classification Search
None
See application file for complete search history.

(56) References Cited

U.S. PATENT DOCUMENTS

| | | |
|---|---|---|
| 5,999,902 A | 12/1999 | Scahill |
| 6,301,560 B1 | 10/2001 | Masters |
| 6,332,120 B1 | 12/2001 | Warren |

(Continued)

FOREIGN PATENT DOCUMENTS

WO  WO-2008056251 A2 *  5/2008  ............. G06Q 30/02

OTHER PUBLICATIONS

Stamatina et al. Toward an Integrated Framework for Automated Development and Optimization of Online Advertising Campaigns. (Aug. 6, 2012). Retrieved online Apr. 21, 2018. https://pdfs.semanticscholar.org/0cd0/47034b01e73ee8b3544057743b03a3b2db13.pdf (Year: 2012).*

(Continued)

*Primary Examiner* — James A Reagan
(74) *Attorney, Agent, or Firm* — Fish & Richardson P.C.

(57) ABSTRACT

Methods, systems, and apparatus, including computer programs encoded on a computer storage medium, for speech recognition are disclosed. In one aspect, a method includes receiving a candidate adword from an advertiser. The method further includes generating a score for the candidate adword based on a likelihood of a speech recognizer generating, based on an utterance of the candidate adword, a transcription that includes a word that is associated with an expected pronunciation of the candidate adword. The method further includes classifying, based at least on the score, the candidate adword as an appropriate adword for use in a bidding process for advertisements that are selected based on a transcription of a speech query or as not an appropriate adword for use in the bidding process for advertisements that are selected based on the transcription of the speech query.

16 Claims, 5 Drawing Sheets

(51) Int. Cl.
*G10L 15/187* (2013.01)
*G10L 15/26* (2006.01)

(56) References Cited

U.S. PATENT DOCUMENTS

| | | |
|---|---|---|
| 6,622,121 B1 | 9/2003 | Crepy et al. |
| 6,928,614 B1 | 8/2005 | Everhart |
| 7,805,740 B2 | 9/2010 | Gilboa |
| 8,190,479 B2 | 5/2012 | Surendran |
| 8,447,606 B2 | 5/2013 | Neubacher et al. |
| 8,527,274 B2 | 9/2013 | Freeman |
| 8,775,251 B1 | 7/2014 | Archak et al. |
| 2005/0222846 A1 | 10/2005 | Tomes |
| 2006/0069564 A1 | 3/2006 | Allison |
| 2006/0074664 A1 | 4/2006 | Lam et al. |
| 2008/0004953 A1 | 1/2008 | Ma |
| 2008/0075237 A1 | 3/2008 | Landschaft |
| 2009/0113475 A1* | 4/2009 | Li .................... G06F 17/30817 725/39 |
| 2010/0086107 A1 | 4/2010 | Tzruya |
| 2011/0131038 A1* | 6/2011 | Oyaizu .................. G10L 15/06 704/10 |
| 2013/0054235 A1 | 2/2013 | Mozer |
| 2013/0117020 A1 | 5/2013 | Chung |
| 2013/0273968 A1* | 10/2013 | Rhoads ............. G06F 17/30244 455/556.1 |
| 2014/0012586 A1 | 1/2014 | Rubin et al. |

OTHER PUBLICATIONS

International Search Report and Written Opinion in International Application No. PCT/US2016/030696, dated Aug. 1, 2016, 17 pages.

Kou et al., "Fix it where it fails: Pronunciation learning by mining error corrections from speech logs," 2015 IEEE International Conference on Acoustics, Speech and Signal Processing (ICASSP), Apr. 19, 2015, pp. 4619-4623, XP055290051.

International Preliminary Report on Patentability issued in International Application No. PCT/US2016/030696, dated Nov. 23, 2017, 12 pages.

* cited by examiner

SPEECH RECOGNITION FOR KEYWORDS

TECHNICAL FIELD

This specification generally relates to speech recognition.

BACKGROUND

Speech recognition has become an increasingly popular mode of human-machine interaction. As the number and types of devices that users interact with on a daily basis has grown, speech recognition has become a convenient and efficient way of inputting information into a computing device. In some instances, transcription of a user's spoken input using speech recognition techniques can be preferable to typing input with a physical or virtual keyboard. Mobile devices such as smartphones sometimes provide a virtual keyboard through which input can be provided by tapping or swiping across letters presented on a touchscreen display of the device. However, virtual keyboards provided on small-screen displays can be difficult for some to use, and generally requires that the user have at least one free hand to provide the input. One useful alternative to the virtual keyboard for typing or otherwise inputting information is speech recognition. Through speech recognition techniques, a user can speak what he or she intends to have typed, and the device responds accordingly such as by presenting transcribed text that corresponds to the user's spoken input. One objective of speech recognition techniques is to accurately interpret a user's spoken input.

SUMMARY

When trying to reach potential customers, advertisers may bid on keywords that users enter into search engines. These keywords may be referred to as "adwords." When a user types a search query into a search box, an advertisement system compares bids from different advertisers that bid on the keywords of the search query as well as other criteria to select advertisements to display to the user. The search engine also displays search results with the selected advertisements.

Instead of typing the search query, the user may speak the search query. The device that the user is speaking into may perform speech recognition on the user's speech to generate a transcription of the user's speech. The speech recognition system provides the transcription to the search engine and the advertisement system. The advertisement system selects advertisements based on the transcription, and the search engine displays those advertisements as well as the search results of the transcription.

When bidding on keywords, some advertisers may want to bid on names such as their business name or a name of their product. Some of the business names and product names may not be pronounced the same way a text-to-speech system pronounces the business name or product name. A chicken restaurant named "Chicken$^3$" that wants to bid on the keyword "chicken$^3$" may present a couple of problems. First, the restaurant may pronounce the keyword "chicken$^3$" as "chicken cubed." In other words, the expected pronunciation of "chicken$^3$" is "chicken cubed," and when a user speaks "chicken$^3$" the speech recognizer will transcribe "chicken cubed." Thus, when a user speaks "chicken cubed," no advertisements for "chicken$^3$" are displayed to the user because the system interprets "chicken$^3$" as "chicken three." Second, because "chicken cubed" is not a very common phrase, a speech recognizer may be more likely to believe a user is speaking another more common, similar sounding phrase such as "chicken soup." If the transcription is "chicken soup," then the advertisement system will present advertisements for advertisers that bid on "chicken soup" instead of "chicken$^3$."

When an advertiser enters "chicken$^3$" into a keyword bidding system, the system may notify the user that "chicken$^3$" is not in the vocabulary of the speech recognizer. Because a text-to-speech system may pronounce "chicken$^3$" as "chicken three," the keyword bidding system may also provide information to the advertiser regarding the frequency of "chicken three" in the language model of the speech recognizer. "Chicken three" may appear infrequently in the language model. With these pieces of information, the keyword bidding system may provide information to the advertiser indicating that "chicken$^3$" is not an appropriate term for bidding in the context of a speech query. The advertiser may then enter the keyword "chicken cubed." The keyword bidding system may provide information that "chicken cubed" is in the vocabulary of the speech recognizer as well as information related to possible misrecognitions if a user were to speak "chicken cubed" in such a way that the speech recognizer was unable to accurately transcribe it. The keyword bidding system may suggest similar sounding keywords such as "vacuum tube" and "chicken soup" as the advertiser may want to bid on those keywords to reach the largest possible audience of users who search for "chicken$^3$" using speech queries.

An innovative aspect of the subject matter described in this specification may be implemented in method that includes the actions of receiving a candidate adword from an advertiser; generating a score for the candidate adword based on a likelihood of a speech recognizer generating, based on an utterance of the candidate adword, a transcription that includes a word that is associated with an expected pronunciation of the candidate adword; and classifying, based at least on the score, the candidate adword as an appropriate adword for use in a bidding process for advertisements that are selected based on a transcription of a speech query or as not an appropriate adword for use in the bidding process for advertisements that are selected based on the transcription of the speech query.

These and other implementations can each optionally include one or more of the following features. The action of generating the score includes comparing the candidate adword to one or more terms that are recognized by the speech recognizer. The utterance of the candidate adword is provided by a text to speech system. The actions further include receiving, from the advertiser, a bid that is associated with the candidate adword. The actions further include receiving, from the advertiser, a bid that is associated with a transcription of the expected pronunciation of the candidate adword. The action of receiving a candidate adword from an advertiser includes receiving an utterance spoken by the advertiser of the candidate adword; and designating a transcription of the utterance spoken by the advertiser as the candidate adword.

The action of generating a score for the candidate adword is further based on a language model score for the candidate adword and an acoustic model score for the candidate adword. The actions further include receiving data indicating that the language model is updated; based on the updated language model, generating an updated score for the candidate adword based on an updated likelihood of a speech recognizer generating, based on the utterance of the candidate adword, a transcription that includes a word that is associated with the expected pronunciation of the candidate adword; and classifying, based at least on the updated score, the candidate adword as an appropriate adword for use in the bidding process for advertisements that are selected based on the transcription of the speech query or as not an appropriate adword for use in the bidding process for advertisements that are selected based on the transcription of the speech query.

The actions further include determining one or more terms that are used in the bidding process and that are similar to the expected pronunciation of the candidate adword; providing, for display to the advertiser, the one or more terms; and receiving, from the advertiser, a bid that is associated with one or more of the one or more terms. The action of providing, for display to the advertiser, the one or more terms includes providing misrecognition frequencies that each indicate a frequency that the expected pronunciation of the candidate adword is misrecognized as a respective term. The actions further include providing data indicating whether an advertisement was displayed when the expected pronunciation of the candidate adword is misrecognized as the respective term.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. The system may suggest keywords for advertisers to bid on when the keywords entered by the advertiser are not in the vocabulary of a speech recognizer.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
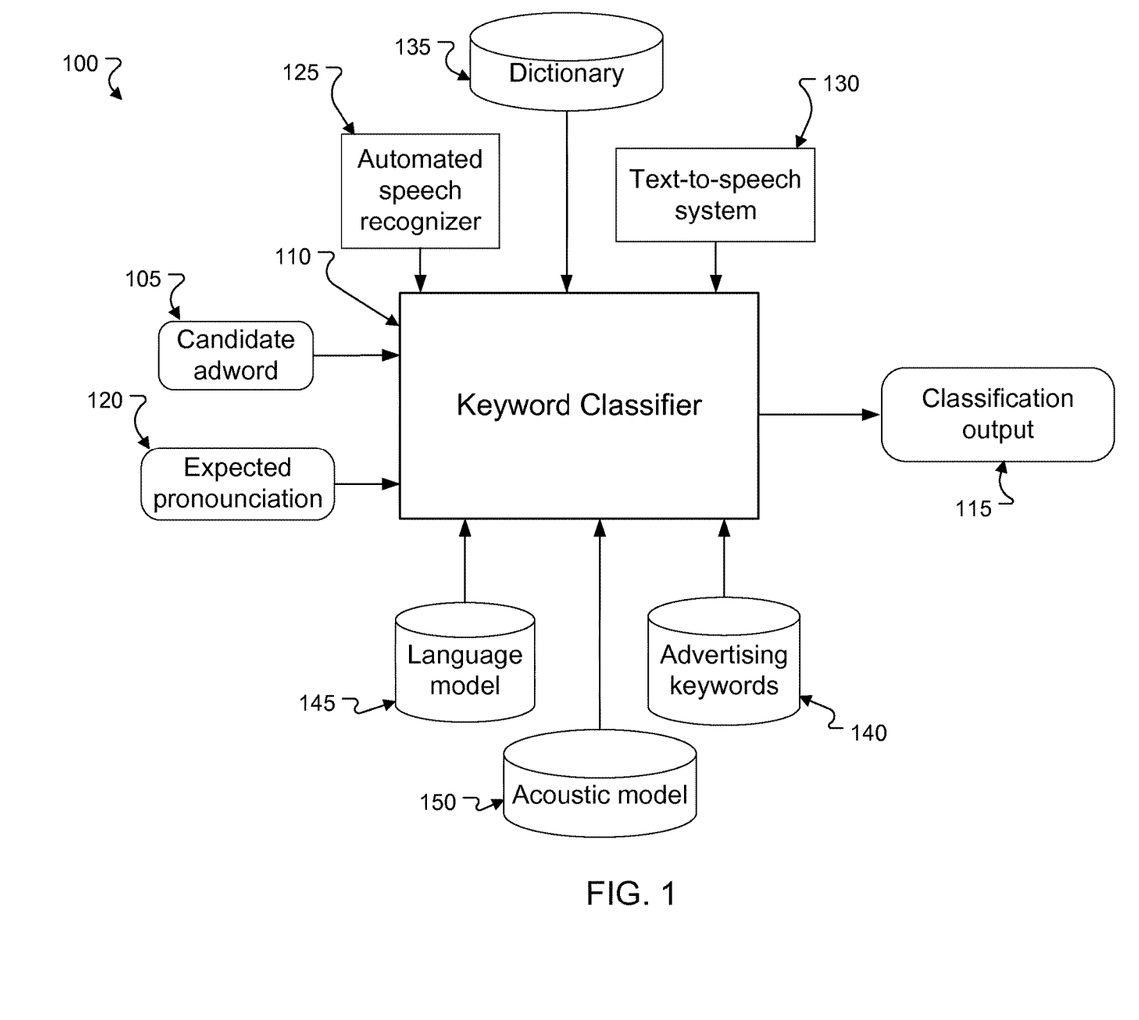
FIG. 1 is a block diagram of an example system for classifying candidate adwords as appropriate for bidding or not appropriate for bidding.

FIG. 1 is a block diagram of an example system 100 for classifying candidate adword as appropriate for bidding or not appropriate for bidding. Briefly, and as described in further detail below, an advertiser submits a candidate adword 105 to a system 100 to determine if the candidate adword 105 is an appropriate adword to bid on for speech queries. The system 100 processes the candidate adword 105 using a keyword classifier 110. The keyword classifier 110 accesses various data sources to assign a classification 115 to the candidate adword 105. The keyword classifier 110 classifies the candidate adword 105 as appropriate for bidding for speech queries or not appropriate for bidding for speech queries.

In the example shown in FIG. 1, an advertiser accesses a keyword bidding system to input the advertiser's selection of an adword to bid on in the context of a speech query. An advertiser bids on an adword to participate in an auction to display an advertisement to a user upon the user entering a query into a search engine. For example, a user may enter the query "pizza." The advertising management system conducts an auction using the bid values submitted by each advertiser that bid on "pizza" and analyzes other criteria to select advertisements from advertisers that bid on "pizza." The advertising management system then displays those advertisements to the user along with the search engine results.

The keyword bidding system may be configured to assist the advertiser in identifying adwords that may result in a greater exposure for the advertiser. One way that the keyword bidding system may assist an advertiser is to use a keyword classifier 110. As noted above, the keyword classifier 110 analyses the candidate adword 105 to classify the candidate adword 105 as appropriate for bidding or not appropriate for bidding in the context of a speech query. A candidate adword 105 that is appropriate for bidding may be one that a speech recognizer is configured to recognize when a user pronounces a candidate adword using an expected pronunciation. A candidate adword 105 that is not appropriate for bidding may be one that a speech recognizer is not configured to recognize when a user pronounces a candidate adword using an expected pronunciation.

An expected pronunciation 120 is a way of saying the candidate adword 105 that may pronounce some numbers or symbols included in the candidate adword 105 as letters. For example, an expected pronunciation for "se7en" may be "SEV-uhn," "broth3rs" may be "three BRUHTH-ers," "chicken4" may be "CHIK-uhn KWOT-roh," and "t4 two" may be "tee fawr too." An expected pronunciation may be associated with one or more words such as words that have a pronunciation that is the same as the expected pronunciation. For example, "SEV-uhn" may be associated with "seven," "three BRUHTH-ers" may be associated with "three brothers," "CHIK-uhn KWOT-roh" may be associated with "chicken quattro," and "tee fawr too" may be associated with "tea for two." The expected pronunciation may be received from the advertiser after the keyword classifier 110 prompts the advertiser to speak the candidate adword 105. The keyword classifier 110 compares the words associated with the expected pronunciation with the candidate adword 105 to classify the candidate adword 105.

In some implementations, to assign a classification 115 to a candidate adword 105, the keyword classifier 110 compares the candidate adword 105 to words that are recognized by an automatic speech recognizer 125. The automatic speech recognizer 125 is configured to convert audio data associated with an utterance to a transcription that includes words in the automatic speech recognizer's vocabulary. The vocabulary of the automatic speech recognizer 125 may include words such as "chicken," "brothers," and "seven." The vocabulary of the automatic speech recognizer 125 may not include words such as "se7en," broth3rs," and "t4." The keyword classifier 110 may use the comparison between the candidate adword 105 and the vocabulary of the automatic speech recognizer 125 as a factor in classifying the candidate adword.

In some implementations, to assign a classification 115 to a candidate adword 105, the keyword classifier 110 may provide the candidate adword 105 to a text-to-speech system 130. The text-to-speech system 130 is configured to convert text to audio data. The keyword classifier 110 may play the audio data to the user. The keyword classifier 110 may provide the audio data from the text-to-speech system 130 to the automatic speech recognizer 125 for the automatic speech recognizer 125 to transcribe the audio data. As an example, the text-to-speech system 130 may read "se7en" as "se seven en," and the automatic speech recognizer 125 may transcribe the audio data corresponding to "se seven en" as "see seven inn." As another example, the text-to-speech system 130 may read "chicken" as "chicken," and the automatic speech recognizer 125 may transcribe the audio data corresponding to "chicken" as "chicken." The keyword classifier 110 may use the audio data from the text-to-speech system 130 as a factor in classifying the candidate adword.

In some implementations, to assign a classification 115 to a candidate adword 105, the keyword classifier 110 may compare the candidate adword 105 to vocabularies such as a dictionary 135 and advertising keywords 140. The dictionary 135 may include words or a subset of words of one or more languages. For example, the dictionary 135 may include a subset of English words. The advertising keywords 140 may include words that are available for bidding in the keyword bidding system. The advertising keywords 140 may include words such as "pizza," "furniture," and "carpenter" but not words such as "best," "very," and "most." The keyword classifier 110 may use the fact that the candidate adword 105 is included in the dictionary 135 or advertising keywords 140 as a factor in classifying the candidate adword.

In some implementations, to assign a classification 115 to a candidate adword 105, the keyword classifier 110 may access a language model 145 or an acoustic model 150. The language model 145 may provide data related to probabilities of particular word sequences. For example, the language model 145 may calculate a higher likelihood that a user would type or speak the query "mobile phone" rather than "mobile groan." The acoustic model 150 may provide data related to the phonemes of an utterance matching phonemes of a particular language. For example, the acoustic model 150 may calculate a probability that each phoneme in an utterance of "mobile" matches the phonemes "/m/ /ō/ /b/ /ə/ /l/." The language model 145 and acoustic model 150 may also be used by the automated speech recognizer 145.

Figure 2:
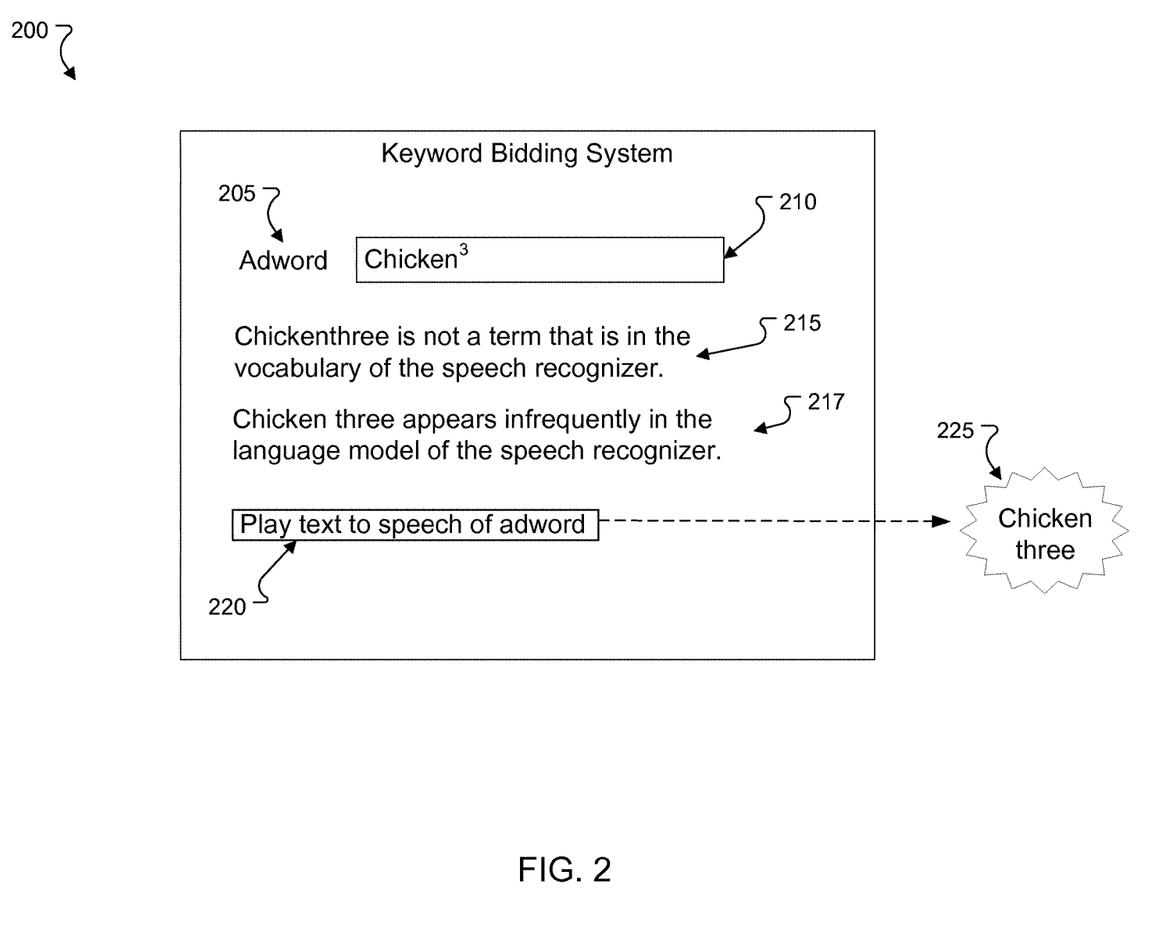
FIGS. 2-3 are example screenshots of user interfaces that display the results of classifying a candidate adword.

FIG. 2 is an example screenshot of a user interface 200 that displays the results of classifying a candidate adword. The user interface 200 illustrates a user interface for a keyword bidding system and more specifically a keyword classifier. The system 100 from FIG. 1 that includes the keyword classifier 110 may be an example of a system that may generate the user interface 200.

To view the user interface 200, an advertiser may access a keyword bidding system. The keyword bidding system allows an advertiser to enter adwords that the advertiser would like to display advertisements for when a user speaks or enters a query that includes the adword. The advertiser may access the keyword bidding system through a web browser or through an application running on an operating system of a computing device. The keyword bidding system may include a keyword classifier to indicate to the advertiser whether the adword is appropriate for bidding or not.

In the example user interface 200, the advertiser has entered the candidate adword 205 "chicken$^3$" into the text box 210. The advertiser may want to present an advertisement when a user enters or speaks "chicken$^3$" because "chicken$^3$" may be the name of the advertiser's business or a product that the advertiser sells. Once the advertiser enters the adword 205, the keyword bidding system may provide feedback to the user suggesting whether the adword 205 is an appropriate adword for bidding or not an appropriate adword for bidding in the context of a spoken search query.

In some implementations, the keyword bidding system compares the adword entered by the advertiser to a vocabulary of words that are recognized by an automatic speech recognizer. The automatic speech recognizer is configured to transcribe utterances spoken by a user. The automatic speech recognizer selects words from its vocabulary that match the audio data of the utterance. If the advertiser enters an adword that is not in the vocabulary of the automatic speech recognizer, then no spoken query will trigger a presentation of an advertisement for that adword. In user interface 200, the keyword bidding system has provided feedback 215 to indicate to the advertiser that the adword "chickenthree" is not in the vocabulary of the automatic speech recognizer. If the advertiser had entered an adword that was in the vocabulary of the speech recognizer, then the feedback would indicate that the adword is a term that the speech recognizer would recognize. As noted previously, the expected pronunciation of "chicken$^3$" corresponds to "chicken cubed," but the keyword bidding system interprets "chicken$^3$" as corresponding to "chicken three." Thus, when a user speaks "chicken$^3$" with the expected pronunciation, the user won't see advertisements for "chicken$^3$" if the advertiser only bid on "chicken$^3$."

In some implementations, the keyword bidding system compares a text-to-speech generated pronunciation of the candidate adword 205 to a language model of terms recognized by the speech recognizer. The keyword bidding system 205 may provide information in feedback 217 to indicate a frequency that the candidate adword 205 appears in the language model. More common terms such as "cheese pizza" would have a higher frequency in the language model than terms such as "mobile groan." In the example of FIG. 2, feedback 217 indicates that "chicken three" appears infrequently in the language model. The infrequency is likely because users do not often speak "chicken three" as a search query.

To assist the user in selecting an appropriate adword, the keyword bidding system may provide a text-to-speech control 220. Upon selecting the text-to-speech control 220, a text-to-speech system converts the adword 205 to audio data and outputs the audio data to an audio output device such as a speaker. In some implementations, the text-to-speech control 220 may also provide the audio data to the automatic speech recognizer. The automatic speech recognizer may transcribe the audio data from the text-to-speech system and provide the transcription to the user interface 200. In the example user interface 200, the transcription "chicken three" would be displayed to the user such as in feedback 217.

Figure 3:
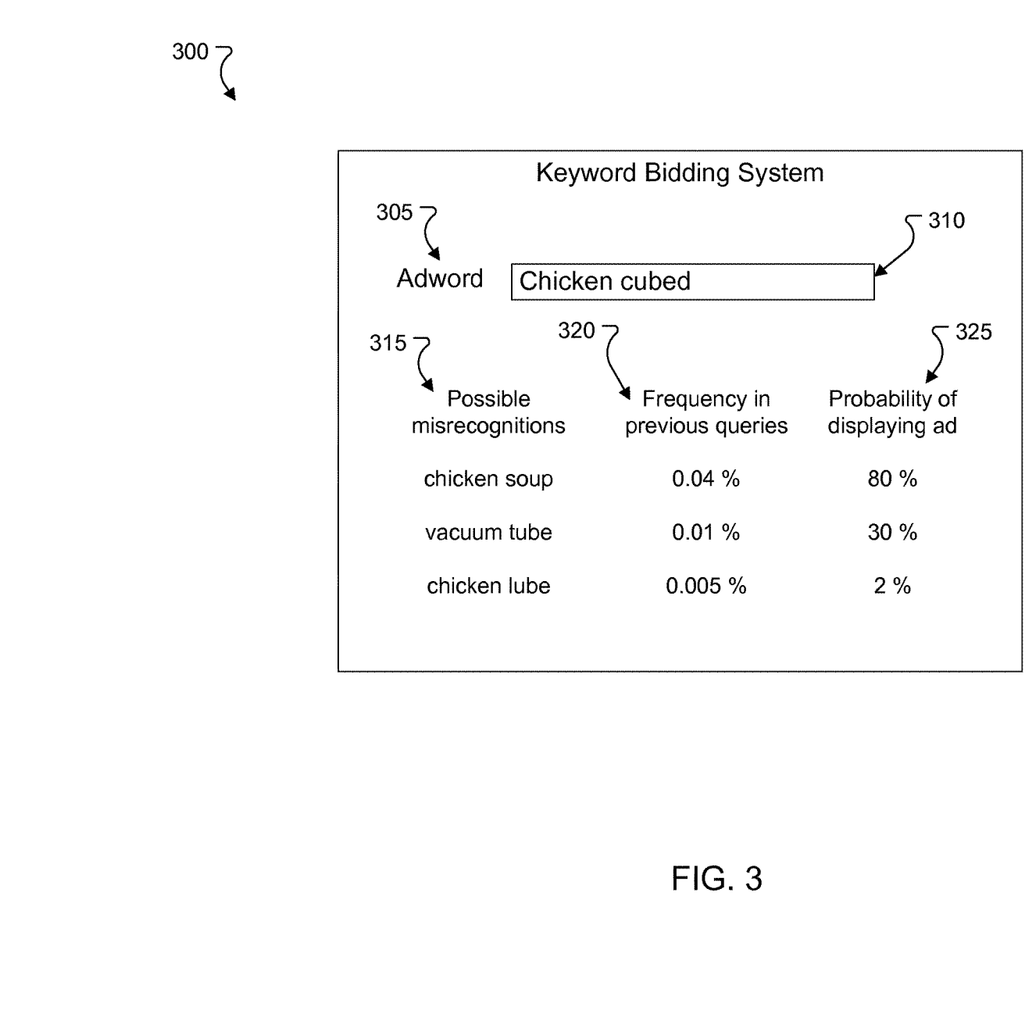

FIG. 3 is an example screenshot of a user interface 300 that displays the results of classifying a candidate adword. The user interface 300 illustrates a user interface for a keyword bidding system and more specifically a keyword classifier. The system 100 from FIG. 1 that includes the keyword classifier 110 may be an example of a system that may generate the user interface 300.

To view the user interface 300, an advertiser may access a keyword bidding system. The keyword bidding system allows an advertiser to enter adwords that the advertiser would like to display advertisements for when a user speaks or enters a query that includes the adword. The advertiser may access the keyword bidding system through a web browser or through an application running on an operating system of a computing device. The keyword bidding system may include a keyword classifier to indicate to the advertiser whether the adword is appropriate for bidding or not.

In the example user interface 300, the advertiser may enter the adword 305 by typing the adword in text box 310 or by speaking the adword 305. The advertiser may navigate to user interface 300 after interacting with user interface 200 and realizing that the adword 205 would not be appropriate for bidding on as a spoken query because the adword 205 is not in the vocabulary of the speech recognizer. Therefore, the advertiser may type in words associated with the expected pronunciation of the adword 305 or speak the adword 305. In this example, the adword 305 is "chicken cubed."

The user interface 300 displays the possible misrecognitions 315 based on the adword 305. The possible misrecognitions 315 are queries that are similar to an utterance of the adword 305 such that a speech recognizer may conclude that a user was saying one of the possible misrecognitions 315 instead of the adword 305. In some implementations, to identify possible misrecognitions, the keyword bidding system may prompt the advertiser to speak the adword 305 if the advertiser did not speak the adword 305 to enter the adword 305. In some implementations, to identify possible misrecognitions, the keyword bidding system may provide the adword 305 to a text-to-speech system. Once the keyword bidding system has audio data from an utterance of the adword 305, the keyword bidding system may apply a language model and an acoustic model to the audio data to identify possible misrecognitions. The acoustic model identifies the phonemes of the utterance to identify likely words in the utterance. The acoustic model may assign scores to each of the phonemes in the utterance or to each of the likely words. The score may indicate the confidence that the likely phonemes or likely words are correct. The language model identifies likely word combinations from the likely phonemes or likely words identified by the acoustic model. The language model may calculate scores for each of the phrases. In some implementations, if the advertiser enters the adword 315 that includes words that correspond to an expected pronunciation of the adword 315, the keyword bidding system may use the acoustic model and language model to identify possible misrecognitions from the text of the adword 315.

In some implementations, the keyword bidding system identifies possible misrecognitions using acoustic models and language models that have been trained in various noise environments. For example, the acoustic model may have been trained with car noise or with wind noise. The keyword bidding system may identify possible misrecognitions by considering confidence scores from acoustic models trained under different noise conditions.

In the example shown in user interface 300, the keyword bidding system has identified three possible misrecognitions 315 for the adword 305 "chicken cubed." The possible misrecognitions 315 are "vacuum tube," "chicken soup," and "chicken lube." The keyword bidding system compares each of the possible misrecognitions 315 to previous queries provided by users. The previous queries may be separated into previous spoken queries and previous typed queries and the frequencies that each possible misrecognition appears in each group may be provided to the advertiser. The frequencies in previous queries 320 indicates that "chicken soup" was included in 0.04% of the previous queries, "vacuum tube," was included in 0.01% of the previous queries, and "chicken lube" was included in 0.005% of the previous queries.

In some implementations, the keyword bidding system may also provide information related to a location of the user when the user typed or spoke the possible misrecognitions 315. For example, the keyword bidding system may provide information that indicates the neighborhoods or zip codes that different percentages of users were in when they spoke or typed "chicken soup." The keyword bidding system may also provide the most common location or a particular number of top locations where users were then they spoke or typed "chicken soup."

In some implementations, the keyword bidding system may also provide information related to a time of day, day of the week, or time of year when the user typed or spoke the possible misrecognitions 315. For example, the keyword bidding system may provide information that indicates fifty percent of the users who spoke or typed "chicken soup" as a query did so between the hours of 9 am and 12 pm. The keyword bidding system may also provide the most common times of the day, days of the week, or times of the year when users spoke or typed "chicken soup" as a query.

In some implementations, the keyword bidding system may also provide information related to the context of a query when a user typed or spoke the possible misrecognitions 315. For example, the keyword bidding system may indicate that a certain percentage of users were in the middle of a electronics search or travel planning when speaking or typing "chicken soup." The keyword bidding system may also provide the most common contexts when users spoke of typed "chicken soup" as a query.

The user interface 300 also includes a probability 325 of an advertisement being displayed when a user types of speaks the possible misrecognitions 315. As shown in user interface 300, the probability 325 of an advertisement being displayed when a user types or speaks "chicken soup" is eighty percent. There may be various reasons that an ad may not be displayed when a user inputs a query such as no advertiser has bid on the query, the advertiser bid on the user typing in the query and the user spoke the query, the context of the query did not match the context requested by the advertiser, the location of the user did not match the location requested by the advertiser, and other similar reasons.

The user interfaces 200 and 300 may each provide adword data that is related to typed queries or spoken queries or both. The user interfaces 200 and 300 may separate the data and indicate for each field whether the data is associated with typed queries or spoken queries or combine the data. The advertiser may select an adword to bid on for spoken queries or typed queries or both.

The data provided in user interfaces 200 and 300 is data that is continuously updated by the keyword bidding system. As users search speak and type more queries, the previous query data updates and as more advertisements are displayed, the probabilities of different queries triggering an advertisement are updated. The acoustic models and language models may also be updated as users speak more queries. The keyword bidding system may notify the advertisers when data related to their keywords has been updated. The keyword bidding system may also notify the advertisers on a periodic basis the status of the data related to their keywords, including notifying the advertisers if there has been no change in the data. The advertisers may choose to update the adwords that they bid on given the updated data.

Figure 4:
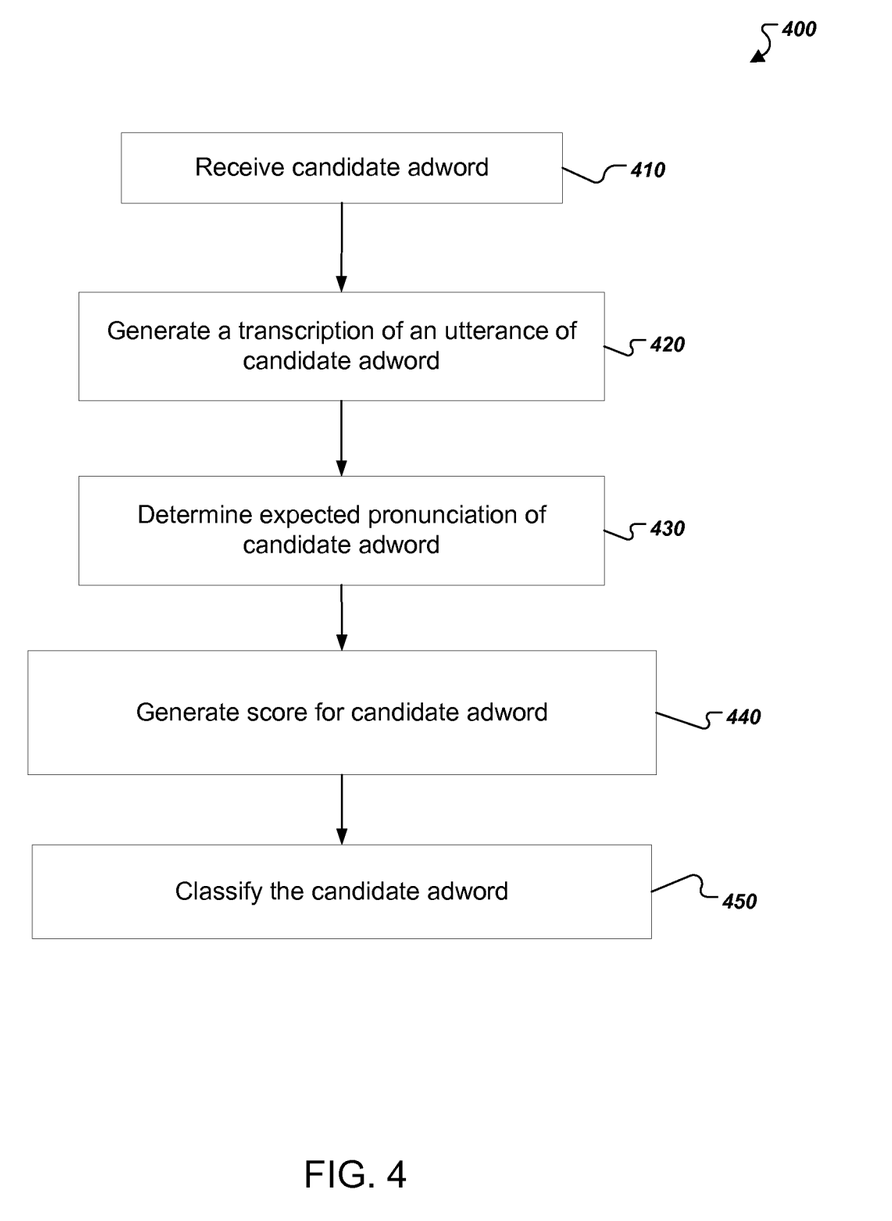
FIG. 4 is a flowchart of an example process for classifying candidate adwords as appropriate for bidding or not appropriate for bidding.

FIG. 4 is a flowchart of an example process 400 for classifying candidate adwords as appropriate for bidding or not appropriate for bidding. In general, the process 400 analyzes a candidate adword, calculates a score for the candidate adword, and then classified the candidate adword as appropriate for use in a bidding process for advertisements selected based on spoken queries. The process 400 will be described as being performed by a computer system comprising one or more computers, for example, the system 100 as shown in FIG. 1.

The system receives the candidate adword (410). In some implementations, system receives, from an advertiser, the candidate adword through text input. For example, the advertiser may type "chicken$^3$" or "chicken cubed" directly into a text input box for a candidate adword. In some implementations, the advertiser speaks the candidate adword and the system transcribes the advertiser's speech. For example, the advertiser may speak "chicken cubed" and the system transcribes "chicken cubed."

The system generates a transcription of an utterance of the candidate adword (420). In implementations where the advertiser types the candidate adword, the system generates an utterance of the candidate adword. The system generates the utterance through a text-to-speech system. The advertiser may select a control to play the utterance of the candidate adword to assist the advertiser in determining whether to bid on the candidate adword in a speech query.

The system determines an expected pronunciation of the candidate adword (430). The expected pronunciation is a way of saying the candidate adword that may pronounce some numbers or symbols included in the candidate adword 105 as letters. The system may receive an expected pronunciation from the advertiser by recording the advertiser speaking the candidate adword.

The system generates a score for the candidate adword based on a likelihood of a speech recognizer generating a transcription that includes a word associated with expected pronunciation (440). The system generates a score by combining information from one or more data sources. The system may compare the candidate adword to the vocabulary of words recognized by an automatic speech recognizer. For example, words such as "chicken" and "three" would be words recognized by the automatic speech recognizer, but "chicken$^3$" and "se7en" would not be recognized. The system may compare the candidate adword to words that are available for bidding. Most words such as "chicken" and "three" are available for bidding, but words such as "best" and "very" may not be available for bidding unless part of a larger query.

The system may access an acoustic model and a language model to determine acoustic model scores and language model scores for words associated with the expected pronunciation of the candidate adword, the candidate adword, or the transcription of the text-to-speech utterance. The acoustic and language model scores may be based on a likelihood that the words associated with the expected pronunciation of the candidate adword, the candidate adword, or the transcription of the text-to-speech utterance may be misrecognized by the automatic speech recognizer. For example, the adword "chicken cubed" may have a low language model score because the words are similar sounding to "chicken soup" which is a more common phrase. The adword "cheese pizza" may have a high language model score because the words, while similar to words such as "sneeze pizza," are more common together than other similar sounding phrases. The adword "seven" may have a low acoustic model score because the word may sound similar to "heaven." In contrast, the adword "pizza" may have a higher acoustic model score because the word does not sound similar to other words.

In some implementations, the score for the adword may be a sum of the scores generated from each of the data sources. In some implementations, the score for the adword may be a weighted average of the scores generated from each data source. The advertiser or the system may choose to weigh different scores higher depending on the available data. A speech recognizer, language model, or acoustic model that has not been trained with a significant amount of data may be weighed less than data from other sources.

The system classifies, based at least on the score, the candidate adword as an appropriate adword for use in a bidding process for advertisements that are selected based on a transcription of a speech query or as not an appropriate adword for use in the bidding process for advertisements that are selected based on the transcription of the speech query (450). Once the advertiser receives a classification of the candidate adword, the advertiser may choose to provide a bid for the candidate adword. For example, the advertiser may choose to bid two cents for each advertisement shown when a user speaks "chicken cubed."

The data that the system uses to score the candidate adwords may be continuously updated as more users provide search queries and interact with the corresponding search results and advertisements. As the data is updated, the system may provide notification to the advertiser that the data has updated and provide an updated classification for the candidate adword. The system may maintain a record of the adwords that an advertiser has previously entered but not bid on and provide updates on those adwords also. Once the advertiser has received an updated classification, the advertiser may choose to update a bid amount or update a bidding decision.

Figure 5:
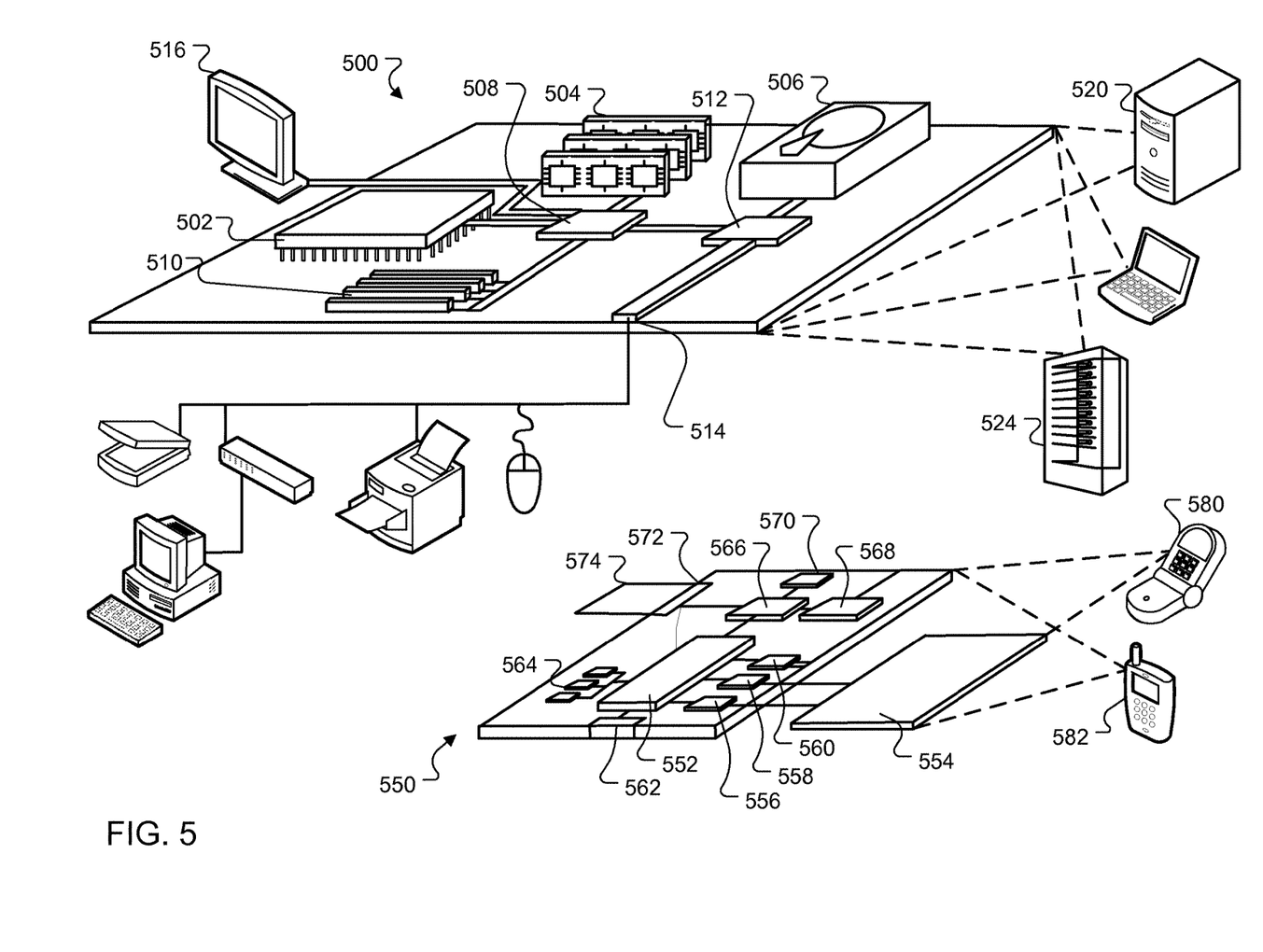
FIG. 5 shows an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by a computing device and from an advertiser, a textual representation of a candidate adword for use in a bidding process for selecting advertisements based on a transcription of a speech query;
generating, by a text to speech module of the computing device, data that represents an audible representation of the textual representation of the candidate adword for use in the bidding process for selecting advertisements based on the transcription of the speech query;
based on the data that represents the audible representation of the textual representation of the candidate adword for use in the bidding process for selecting advertisements based on the transcription of the speech query, generating a transcription of the audible representation of the textual representation of the candidate adword for use in the bidding process for selecting advertisements based on the transcription of the speech query;
applying an acoustic model for a speech recognizer to the audible representation of the textual representation of the candidate adword for use in the bidding process for selecting advertisements based on the transcription of the speech query;
applying a language model for the speech recognizer to the transcription of the audible representation of the textual representation of the candidate adword for use in the bidding process for selecting advertisements based on the transcription of the speech query;
based on applying the acoustic model for the speech recognizer to the audible representation of the textual representation of the candidate adword and based on applying a language model for the speech recognizer to the transcription of the audible representation of the textual representation of the candidate adword, generating, for the textual representation of the candidate adword for use in the bidding process for selecting advertisements based on the transcription of the speech query, a score that reflects a likelihood of the speech recognizer generating, in response to receiving an utterance of the candidate adword, a transcription that includes a word that is associated with the textual representation of the candidate adword; and based at least on the score that reflects the likelihood of the speech recognizer generating, in response to receiving the utterance of the candidate adword for use in the bidding process for selecting advertisements based on the transcription of the speech query, the transcription that includes the word that is associated with the textual representation of the candidate adword, classifying the textual representation of the candidate adword as an appropriate adword for use in the bidding process for selecting advertisements based on the transcription of the speech query or as not an appropriate adword for use in the bidding process for selecting advertisements based on the transcription of the speech query.

2. The method of claim 1, wherein generating the score comprises:
applying the language model for the speech recognizer to the textual representation of the candidate adword.

3. The method of claim 1, comprising:
receiving, from the advertiser, a bid that is associated with the textual representation of the candidate adword.

4. The method of claim 1, comprising:
receiving, from the advertiser, a bid that is associated with a transcription of the audible representation of the textual representation of the candidate adword.

5. The method of claim 1, wherein receiving, from an advertiser, a textual representation of a candidate adword for use in a bidding process for selecting advertisements based on a transcription of a speech query comprises:
receiving an utterance spoken by the advertiser of the candidate adword for use in the bidding process for selecting advertisements based on the transcription of a speech query; and
designating a transcription of the utterance spoken by the advertiser as the textual representation of the candidate adword for use in a bidding process for selecting advertisements based on a transcription of a speech query.

6. The method of claim 1, comprising:
receiving data indicating that the language model is updated;
based on the updated language model, generating an updated score for the textual representation of the candidate adword based on an updated likelihood of a speech recognizer generating, based on the utterance of the textual representation of the candidate adword, a transcription that includes a word that is associated with the textual representation of the candidate adword; and
classifying, based at least on the updated score, the textual representation of the candidate adword as an appropriate adword for use in the bidding process for selecting advertisements based on the transcription of the speech query or as not an appropriate adword for use in the bidding process for selecting advertisements based on the transcription of the speech query.

7. The method of claim 1, comprising:
determining one or more terms that are used in the bidding process and that are similar to the audible representation of the textual representation of the candidate adword;
providing, for display to the advertiser, the one or more terms; and
receiving, from the advertiser, a bid that is associated with one or more of the one or more terms.

8. The method of claim 7, wherein providing, for display to the advertiser, the one or more terms comprises:
providing misrecognition frequencies that each indicate a frequency that the expected pronunciation of the textual representation of the candidate adword is misrecognized as a respective term.

9. The method of claim 8, comprising:
providing data indicating whether an advertisement was displayed when the expected pronunciation of the textual representation of the candidate adword is misrecognized as the respective term.

10. A system comprising:
one or more computers and one or more storage devices storing instructions that are operable, when executed by the one or more computers, to cause the one or more computers to perform operations comprising:
receiving, by a computing device and from an advertiser, a textual representation of a candidate adword for use in a bidding process for selecting advertisements based on a transcription of a speech query;
generating, by a text to speech module of the computing device, data that represents an audible representation of the textual representation of the candidate adword for use in the bidding process for selecting advertisements based on the transcription of the speech query;
based on the data that represents the audible representation of the textual representation of the candidate adword for use in the bidding process for selecting advertisements based on the transcription of the speech query, generating a transcription of the audible representation of the textual representation of the candidate adword for use in the bidding process for selecting advertisements based on the transcription of the speech query;
applying an acoustic model for a speech recognizer to the audible representation of the textual representation of the candidate adword for use in the bidding process for selecting advertisements based on the transcription of the speech query;
applying a language model for the speech recognizer to the transcription of the audible representation of the textual representation of the candidate adword for use in the bidding process for selecting advertisements based on the transcription of the speech query;
based on applying the acoustic model for the speech recognizer to the audible representation of the textual representation of the candidate adword and based on applying a language model for the speech recognizer to the transcription of the audible representation of the textual representation of the candidate adword, generating, for the textual representation of the candidate adword for use in the bidding process for selecting advertisements based on the transcription of the speech query, a score that reflects a likelihood of the speech recognizer generating, in response to receiving an utterance of the candidate adword, a transcription that includes a word that is associated with the textual representation of the candidate adword; and
based at least on the score that reflects the likelihood of the speech recognizer generating, in response to receiving the utterance of the candidate adword for use in the bidding process for selecting advertisements based on the transcription of the speech query, the transcription that includes the word that is associated with the textual representation of the candidate adword, classifying the textual representation of the candidate adword as an appropriate adword for use in the bidding process for selecting advertisements based on the transcription of the speech query or as not an appropriate adword for use in the bidding process for selecting advertisements based on the transcription of the speech query.

11. The system of claim 10, wherein generating the score comprises:
applying the language model for the speech recognizer to the textual representation of the candidate adword.

12. The system of claim 10, wherein the operations further comprise:
receiving, from the advertiser, a bid that is associated with the textual representation of the candidate adword.

13. The system of claim 10, wherein the operations further comprise:
receiving, from the advertiser, a bid that is associated with a transcription of the audible representation of the textual representation of the candidate adword.

14. The system of claim 10, wherein receiving, from an advertiser, a textual representation of a candidate adword for use in a bidding process for selecting advertisements based on a transcription of a speech query comprises:
receiving an utterance spoken by the advertiser of the candidate adword for use in the bidding process for selecting advertisements based on the transcription of a speech query; and
designating a transcription of the utterance spoken by the advertiser as the textual representation of the candidate adword for use in a bidding process for selecting advertisements based on a transcription of a speech query.

15. The system of claim 10, wherein the operations further comprise:
determining one or more terms that are used in the bidding process and that are similar to the audible representation of the textual representation of the candidate adword;
providing, for display to the advertiser, the one or more terms; and
receiving, from the advertiser, a bid that is associated with one or more of the one or more terms.

16. A non-transitory computer-readable medium storing software comprising instructions executable by one or more computers which, upon such execution, cause the one or more computers to perform operations comprising:
receiving, by a computing device and from an advertiser, a textual representation of a candidate adword for use in a bidding process for selecting advertisements based on a transcription of a speech query;
generating, by a text to speech module of the computing device, data that represents an audible representation of the textual representation of the candidate adword for use in the bidding process for selecting advertisements based on the transcription of the speech query;
based on the data that represents the audible representation of the textual representation of the candidate adword for use in the bidding process for selecting advertisements based on the transcription of the speech query, generating a transcription of the audible representation of the textual representation of the candidate adword for use in the bidding process for selecting advertisements based on the transcription of the speech query;
applying an acoustic model for a speech recognizer to the audible representation of the textual representation of the candidate adword for use in the bidding process for selecting advertisements based on the transcription of the speech query;
applying a language model for the speech recognizer to the transcription of the audible representation of the textual representation of the candidate adword for use in the bidding process for selecting advertisements based on the transcription of the speech query;
based on applying the acoustic model for the speech recognizer to the audible representation of the textual representation of the candidate adword and based on applying a language model for the speech recognizer to the transcription of the audible representation of the textual representation of the candidate adword, generating, for the textual representation of the candidate adword for use in the bidding process for selecting advertisements based on the transcription of the speech query, a score that reflects a likelihood of the speech recognizer generating, in response to receiving an utterance of the candidate adword, a transcription that includes a word that is associated with the textual representation of the candidate adword; and
based at least on the score that reflects the likelihood of the speech recognizer generating, in response to receiving the utterance of the candidate adword for use in the bidding process for selecting advertisements based on the transcription of the speech query, the transcription that includes the word that is associated with the textual representation of the candidate adword, classifying the textual representation of the candidate adword as an appropriate adword for use in the bidding process for selecting advertisements based on the transcription of the speech query or as not an appropriate adword for use in the bidding process for selecting advertisements based on the transcription of the speech query.

* * * * *

UNITED STATES PATENT AND TRADEMARK OFFICE
CERTIFICATE OF CORRECTION

| | |
|---|---|
| PATENT NO. | : 10,055,767 B2 |
| APPLICATION NO. | : 14/710928 |
| DATED | : August 21, 2018 |
| INVENTOR(S) | : Aleksic et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 480 days.

Signed and Sealed this
Twenty-third Day of April, 2019

Andrei Iancu
*Director of the United States Patent and Trademark Office*